United States Patent [19]
Toyoshima et al.

[11] Patent Number: 5,172,252
[45] Date of Patent: Dec. 15, 1992

[54] HOLOGRAM SCANNER AND METHOD OF RECORDING AND REPRODUCING HOLOGRAM IN THE HOLOGRAM SCANNER

[75] Inventors: Tetsuro Toyoshima, Nara; Tetsuyuki Ueda, Kita-Katsuragi, both of Japan

[73] Assignee: Sharp Kabushiki Kaisha, Osaka, Japan

[21] Appl. No.: 632,392

[22] Filed: Dec. 21, 1990

[30] Foreign Application Priority Data

Dec. 27, 1989 [JP] Japan .................................. 1-341469

[51] Int. Cl.$^5$ .............................................. G02B 5/32
[52] U.S. Cl. ...................................... 359/16; 359/18
[58] Field of Search ....................... 359/15, 16, 17, 18

[56] References Cited

U.S. PATENT DOCUMENTS

| | | | |
|---|---|---|---|
| 4,266,846 | 5/1981 | Ih ............................................. | 359/18 |
| 4,712,852 | 12/1987 | Funato et al. ........................... | 359/18 |
| 4,768,847 | 9/1988 | Iwaoka et al. ........................... | 359/18 |
| 4,923,262 | 5/1990 | Clay ........................................ | 359/18 |
| 4,925,262 | 5/1990 | Yamagishi et al. ..................... | 359/18 |
| 4,948,213 | 8/1990 | Hasegawa et al. ..................... | 359/18 |

FOREIGN PATENT DOCUMENTS

A-0122783 10/1984 European Pat. Off. .
62208021 3/1986 Japan .

OTHER PUBLICATIONS

Japanese Patent Publication (KoKoKu) No. 61-5129, published on Feb. 15, 1986 (Japanese Patent Application Laying Open (KoKai) No. 54-104849, laid open on Aug. 17, 1979.
Japanese patent Application Laying Open (KoKai) No. 60-194419, laid open on Oct. 2, 1985.

*Primary Examiner*—Bruce Y. Arnold
*Assistant Examiner*—J. P. Ryan
*Attorney, Agent, or Firm*—David G. Conlin; Robert F. O'Connell

[57] ABSTRACT

A hologram scanner includes a reproducing light source for generating a collimated reproducing light beam, a hologram disk being adapted to rotate, and a hologram disposed on the hologram disk for deflecting the reproducing light beam by diffraction so as to scan an image surface by the deflected reproducing light beam during a rotation of the hologram disk. The hologram has interference fringes recorded by a mutual interference of an object light of divergent spherical wave and a reference light of divergent spherical wave. The object light is generated by an object light source positioned at a first position apart from a hologram recording plane of the hologram disk, on which the hologram is to be recorded, by a first distance. The reference light is generated by a reference light source positioned at a second position apart from the hologram recording plane by a second distance. The first and second distances are different from each other so that the deflected reproducing light beam is focused on the image surface.

19 Claims, 15 Drawing Sheets

HOLOGRAM SCANNER AND METHOD OF RECORDING AND REPRODUCING HOLOGRAM IN THE HOLOGRAM SCANNER

BACKGROUND OF THE INVENTION

1. Field of the Invention

The present invention relates to a hologram scanner and a method of recording and reproducing a hologram in the hologram scanner, which is used in an image forming apparatus such as a laser beam printer, and an image reading apparatus.

2. Description of the Related Art

In various kinds of scanning devices used in an image forming apparatus and an image reading apparatus, there is a hologram scanner, which utilizes a hologram as means for deflecting a light beam for scanning.

The hologram scanner has a hologram disk on which a plurality of holograms are arranged along its circumferential direction. When the hologram disk rotates, the reproducing light beam is deflected by the diffraction effect of the hologram. The hologram scanner scans an image surface by the deflected diffraction light beam in a main scanning direction.

Such a hologram is recorded and manufactured by a mutual interference of two light fluxes, i.e. an object light of laser beam and a reference light of laser beam. If a non-aberrational spherical wave or a non-aberrational plane wave are utilized as these two light fluxes, interference fringes are obtained which are represented by quadratic curves, such as circular curves, elliptic curves, parabolic curves, and hyperbolic curves. Accordingly, the hologram is recorded so as to have a desired diffraction power, a desired diffraction direction, a desired focusing power etc., by adjusting the pitch and the shape of the interference fringes.

The hologram thus recorded has a function of focusing the reproducing light beam so as to form a light spot on the image surface as well as the function of deflecting the reproducing light beam.

Methods of recording and reproducing such a hologram can be divided into some cases according to the kinds of the object light, the reference light and the reproducing light, as explained below.

Namely, in a first case, a hologram recorded by the mutual interference of a spherical divergent wave as the object light and a plane wave as the reference light, is reproduced by a collimated reproducing light beam. In this first case, the distance from the hologram to the center of the reproducing light source is infinity, and thus the reproducing light beam diffracted by the hologram is converged at the focal point of the hologram.

In a second case, a hologram recorded by the mutual interference of a spherical divergent wave as the object light and a plane wave as the reference light is reproduced by a divergent reproducing light beam from a point farther than the focal point of the hologram. In this second case, the reproducing light beam is converged at such a far point as to enable a magnified scanning operation.

In a third case, a hologram recorded by the mutual interference of a spherical divergent wave as the object light and a spherical convergent wave as the reference light, is reproduced by a divergent reproducing light beam, so that the aberration with respect to a relatively wide range of scanning angle is made small. Such a case is disclosed in Japanese Patent Laying Open No. 54-104849.

In a fourth case, a hologram recorded by the mutual interference of a spherical divergent wave as the object light and a spherical divergent wave as the reference light is reproduced by a convergent reproducing light beam, so that a hologram can be obtained which focusing power is small and which focal length is long.

In the above explained cases, the focusing ability of the hologram is realized by a gradient in the spatial frequency of the interference fringes of the hologram, while the deflecting ability of the hologram is realized by a change in the direction of the interference fringes of the hologram at its reproducing point in accordance with the rotation of the hologram.

The focal length f of the hologram as a focusing lens is approximately given by the following equation (1).

$$1/f = n\lambda_2/\lambda_1 (1/Z_0 - 1/Z_R) \quad (1)$$

wherein, $\lambda_1$: wave length of the recording (object and reference) light $\lambda_2$: wave length of the reproducing light beam $n$: order of diffraction $Z_0$: distance between the hologram plane and the center of the object light source $Z_R$: distance between the hologram plane and the center of the reference light source The sign of each symbol $Z_0$ and $Z_R$ is positive in case of the divergent light and negative in case of the convergent light.

The following equation (2) is approximately effected as for the relationship between a distance $Z_c$ and a distance $Z_j$, which corresponds to the relationship between the object point and the image point, where the $Z_c$ represents the distance from the hologram plane to the reproducing light source, and the $Z_j$ represents the distance from the hologram plane to the image surface.

$$1/Z_j = 1/Z_c + 1/f \quad (2)$$

wherein, the sign of each symbol $Z_j$ and $Z_c$ is positive in the transmitting direction of the reproducing light beam with respect to the hologram plane.

Accordingly, if the hologram having a focal length f is reproduced by a collimated light beam, the diffraction light beam is focused at the focal point of the hologram. If the hologram is reproduced by a divergent or convergent light beam, the diffraction light beam is focused at the image point as assuming the center of the reproducing light source as an object point.

Thus, in the aforementioned first case of the related art in which the diffraction light beam is converged at the focal point, an obtainable scanning length of the diffraction light beam can be as short as about the moving amount of the hologram in company with the rotation of the hologram.

In the aforementioned second case of the related art, the size of the light spot on the image surface can not be made small during the scanning operation since an abrupt change in the image forming length of the hologram happens as the scanning angle increases.

In the aforementioned third case of the related art, since the hologram functions as a focusing lens having a short focal length, a change of the diffraction light beam due to the shift of the optical axis of the hologram is significantly increased. In addition, a large size lens or a concave mirror is necessary in order to converge the reference light onto the hologram recording plane of the hologram disk in the recording process, which is not preferable from a view point of the recording and manufacturing process of the hologram.

In the aformentioned fourth case of the related art, if the hologram is recorded with such a specific condition as $Z_0=Z_R$, the hologram having no focusing ability is obtained. Then, if such a spherical light beam as being focused at the image surface is used as the reproducing light beam, the diffraction light beam is also focused at the image surface. Such a hologram is disclosed in Japanese Patent Laying Open No. 60-194419. Thus, it is expected that a small light spot can be obtained at the image surface since the hologram itself hardly has an aberration. However, in this case, since such a reproducing light beam as converging in a great distance is required, the establishment of the reproducing optical system is very difficult.

Accordingly, there is a first problem of those related arts mentioned above that it is difficult to obtain a hologram having both of a sufficient deflecting ability and a sufficient focusing ability.

By the way, in order to enhance the ability of deflecting the reproducing light beam by use of the hologram, recorded in the above mentioned manners, as the hologram in the aforementioned hologram scanner, such a reproducing condition is requested that the diffraction ability of the hologram itself is high and the incident angle of field of the reproducing light beam with respect to the hologram plane is also large, so as to increase the deflection angle of the diffraction light beam.

However, the aberration, of the diffraction light beam as the scanning light beam, at the image surface is inevitably generated to a great extent under such a reproducing condition.

Main aberrations generated in the reproducing operation of the hologram are coma-aberration, astigmatism, and a curvature of field. The coma-aberration is generated in the sub-scanning direction (Yh direction), which is perpendicular to the main scanning direction (Xh direction). The astigmatism and the curvature of field are generated in the main scanning direction. Such aberrations thus generated make it difficult to reduce the size of the light spot formed out of the reproducing light beam on the image surface.

As a countermeasure to the above explained aberrations, the hologram may be recorded to have such interference fringes that the aberration at the image surface in the reproducing operation of the hologram is reduced, by use of the object light and the reference light including aberration to cancel the aberration of the reproducing light beam.

In fact, it is possible to cancel to some extent the aberration of the reproducing light beam by recording the hologram by use of the aberrational wave, which is generated by obliquely inputting a plane wave or a spherical wave to a spherical lens, as the object light or the reference light.

Generally speaking, it is desired in a hologram scanner to make the light spot smaller and thus enable a scanning operation with a higher resolution.

However, in the above mentioned method using the aberrational wave in the recording operation so as to cancel the aberration generated in the reproducing operation, the aberration in the reproducing operation can be only cancelled in either the main scanning direction or the sub-scanning direction. Namely, if the coma-aberration is effectively cancelled, the astigmatism and the curvature of field remain. On the contrary, if the astigmatism and the curvature of field are effectively cancelled, the coma-aberration remains. Consequently, the above mentioned method has a certain fundamental limit to reduce the size of the light spot on the image surface in the reproducing operation of the hologram.

SUMMARY OF THE INVENTION

It is therefore a first object of the present invention to provide a method of recording and reproducing a hologram in a hologram scanner, in which a hologram having both of a sufficient deflecting ability and a sufficient focusing ability can be recorded by a relatively simple optical recording system, and can be reproduced by a collimated reproducing light beam.

It is a second object of the present invention to provide a hologram scanner in which a hologram having both of a sufficient deflecting ability and a sufficient focusing ability can be recorded by a relatively simple optical recording system, and can be reproduced by a collimated reproducing light beam.

It is a third object of the present invention to provide a method of recording and reproducing a hologram in a hologram scanner which can make the light spot small and thus enable a scanning operation with a high resolution.

It is a fourth object of the present invention to provide a hologram scanner which can make the light spot small and thus enable a scanning operation with a high resolution.

According to the present invention, the first object can be achieved by a first method of recording and reproducing a hologram in a hologram scanner. The first method includes the step of generating an object light of divergent spherical wave by an object light source disposed at a first position, toward a hologram recording plane of a hologram disk on which a hologram is to be recorded, the first position being apart from the hologram recording plane by a first distance. The first method also includes the step of generating a reference light of divergent spherical wave by a reference light source disposed at a second position, toward the hologram recording plane so as to record the hologram thereon by a mutual interference of the object light and the reference light, the second position being apart from the hologram recording plane by a second distance. The first method further includes the step of reproducing the hologram by applying a collimated reproducing light beam to the hologram so as to deflect the reproducing light beam by diffraction and scan an image surface by the deflected reproducing light beam while rotating the hologram disk. The first and second distances are different from each other so that the deflected reproducing light beam is focused on the image surface.

According to the present invention, the second object can be achieved by a first hologram scanner including a reproducing light source for generating a collimated reproducing light beam, a hologram disk being adapted to rotate, and a hologram disposed on the hologram disk for deflecting the reproducing light beam by diffraction so as to scan an image surface by the deflected reproducing light beam during a rotation of the hologram disk. The hologram has interference fringes recorded by a mutual interference of an object light of divergent spherical wave and a reference light of divergent spherical wave. The object light is generated by an object light source positioned at a first position apart from a hologram recording plane of the hologram disk, on which the hologram is to be recorded, by a first distance. The reference light is generated by a reference light source positioned at a second position apart from the hologram recording plane by a second distance. The first and second distances are different from each other so that the deflected reproducing light beam is focused on the image surface.

According to the present invention, the third object can be achieved by a second method of recording and reproducing a hologram in a hologram scanner. The second method includes the step of recording a hologram on a hologram recording plane of a hologram disk by a mutual interference of an object light and a reference light, at least one of which is an aberrational wave, so that the hologram has interference fringes different from quadratic curves. The second method also includes the step of reproducing the hologram by applying a reproducing light beam to the hologram so as to deflect the reproducing light beam by diffraction and scan an image surface by the deflected reproducing light beam while rotating the hologram disk. The aberrational wave is generated by inputting a spherical wave to an anamorphic lens which power distribution is determined by mathematical programming so that an aberration of the deflected reproducing light beam on the image surface is minimized.

According to the present inveniton, the third object can be also achieved by a third method of recording and reproducing a hologram in a hologram scanner. The third method includes the step of recording a hologram on a hologram recording plane of a hologram disk by a mutual interference of an object light and a reference light, at least one of which is an aberrational wave, so that the hologram has interference fringes different from quadratic curves. The third method also includes the step of reproducing the hologram by applying a reproducing light beam to the hologram so as to deflect the reproducing light beam by diffraction and scan an image surface by the deflected reproducing light beam while rotating the hologram disk. The aberrational wave is generated by inputting a spherical wave to a compound optical system including a prism and a spherical lens which parameters in shape are determined by mathematical programming so that an aberration of the deflected reproducing light beam on the image surface is minimized.

According to the present invention, the fourth object can be achieved by a second hologram scanner including a reproducing light source for generating a reproducing light beam, a hologram disk being adapted to rotate, and a hologram disposed on the hologram disk for deflecting the reproducing light beam by diffraction so as to scan an image surface by the deflected reproducing light beam during a rotation of the hologram disk. The hologram has interference fringes different from quadratic curves and is recorded by a mutual interference of an object light and a reference light, at least one of which is an aberrational wave. The aberrational wave is generated by inputting a spherical wave to an anamorphic lens which power distribution is determined by mathematical programming so that an aberration of the deflected reproducing light beam on the image surface is minimized.

According to the present invention, the fourth object can be also achieved by a third hologram scanner including a reproducing light source for generating a reproducing light beam, a hologram disk being adapted to rotate, and a hologram disposed on the hologram disk for deflecting the reproducing light beam by diffraction so as to scan an image surface by the deflected reproducing light beam during a rotation of the hologram disk. The hologram has interference fringes different from quadratic curves and is recorded by a mutual interference of an object light and a reference light, at least one of which is an aberrational wave. The aberrational wave is generated by inputting a spherical wave to a compound optical system including a prism and a spherical lens which parameters in shape are determined by mathematical programming so that an aberration of the deflected reproducing light beam on the image surface is minimized.

According to the first method of the present invention, since the first and second distances are different from each other, a focusing power as well as a deflecting power can be given to the hologram recorded by the mutual interference of the divergent spherical waves even though the reproducing light beam is a collimated type. Here, the difference is especially set so that the deflected reproducing light beam is focused on the image surface, i.e. the first and second distances and the distance from the image surface to the hologram satisfy the relationship prescribed by the aforementioned equations (1) and (2). Thus, in the reproducing operation, the collimated reproducing light beam is deflected by the hologram toward the image surface, and is focused on the image surface. Accordingly, in the first method, since both of the object light and the reference light are divergent spherical wave, the recording optical system for recording a hologram having both of a deflecting ability and a focusing ability can be made simple. At the same time, since the reproducing light beam is a collimated type, the establishment of the reproducing optical system in the hologram scanner is easy.

According to the first hologram scanner of the present invention, since it includes the hologram which is recorded and reproduced according to the abovementioned first method, the first hologram scanner having a relatively simplified optical system can perform a scanning operation with a good quality by use of the hologram having both of a sufficient deflecting ability and a sufficient focusing ability which can be recorded by a relatively simple optical recording system and can be reproduced by a collimated light beam.

According to the second method of the present invention, the hologram is recorded by the mutual interference, where at least one of the object light and the reference light is the aberrational wave. The aberrational wave is generated by inputting a spherical wave to the anamorphic lens, which power distribution is determined by mathematical programming so that the aberration of the deflected reproducing light beam on the image surface is minimized. Thus, the anamorphic lens has a lens power in one direction corresponding to the main scanning direction and another lens power in another direction corresponding to the sub-scanning direction which are different from each other. Accordingly, when the hologram recorded by use of the anamorphic lens is reproduced, the aberrations of the reproducing light beam at the image surface, i.e. the coma-aberration in the main scanning direction and the astigmatism and the curvature of field in the sub-scanning direction, can be diminished with a good balance therebetween according to the lens power balance of the anamorphic lens in the corresponding two directions. Consequently, in the second method, the light spot on the image surface can be made small and thus a scanning operation with a high resolution can be realized.

According to the third method of the present invention, the hologram is recorded by the mutual interference, where at least one of the object light and the reference light is the aberrational wave. The aberrational wave is generated by inputting a spherical wave to the compound optical system including the prism and the spherical lens which parameters in shape are determined by mathematical programming so that the aberration of the deflected reproducing light beam on the image surface is minimized. Thus, the compound optical system has a focusing power in one direction corresponding to the main scanning direction and another focusing power in another direction corresponding to the sub-scanning direction which are different from each other. Accordingly, when the hologram recorded by use of the compound optical system is reproduced, the aberrations of the reproducing light beam at the image surface, i.e. the coma-aberration in the main scanning direction and the astigmatism and the curvature of field in the sub-scanning direction, can be diminished with a good balance therebetween according to the focusing power balance of the compound optical system in the corresponding two directions. Consequently, in the third method, the light spot on the image surface can be made small and thus a scanning operation with a high resolution can be realized.

According to the second hologram scanner of the present invention, since it includes the hologram which is recorded and reproduced according to the abovementioned second method, the second hologram scanner can make the light spot on the image surface small and thus realize a scanning operation with a high resolution.

According to the third hologram scanner of the present invention, since it includes the hologram which is recorded and reproduced according to the abovementioned third method, the third hologram scanner can make the light spot on the image surface small and thus realize a scanning operation with a high resolution.

Further objects and advantages of the present invention will be apparent from the following description of the preferred embodiment of the invention as illustrated in the accompanying drawings.

DETAILED DESCRIPTION OF THE PREFERRED EMBODIMENT

A preferred embodiment of the present invention will be described below with reference to the accompanying drawings.

Figure 1:
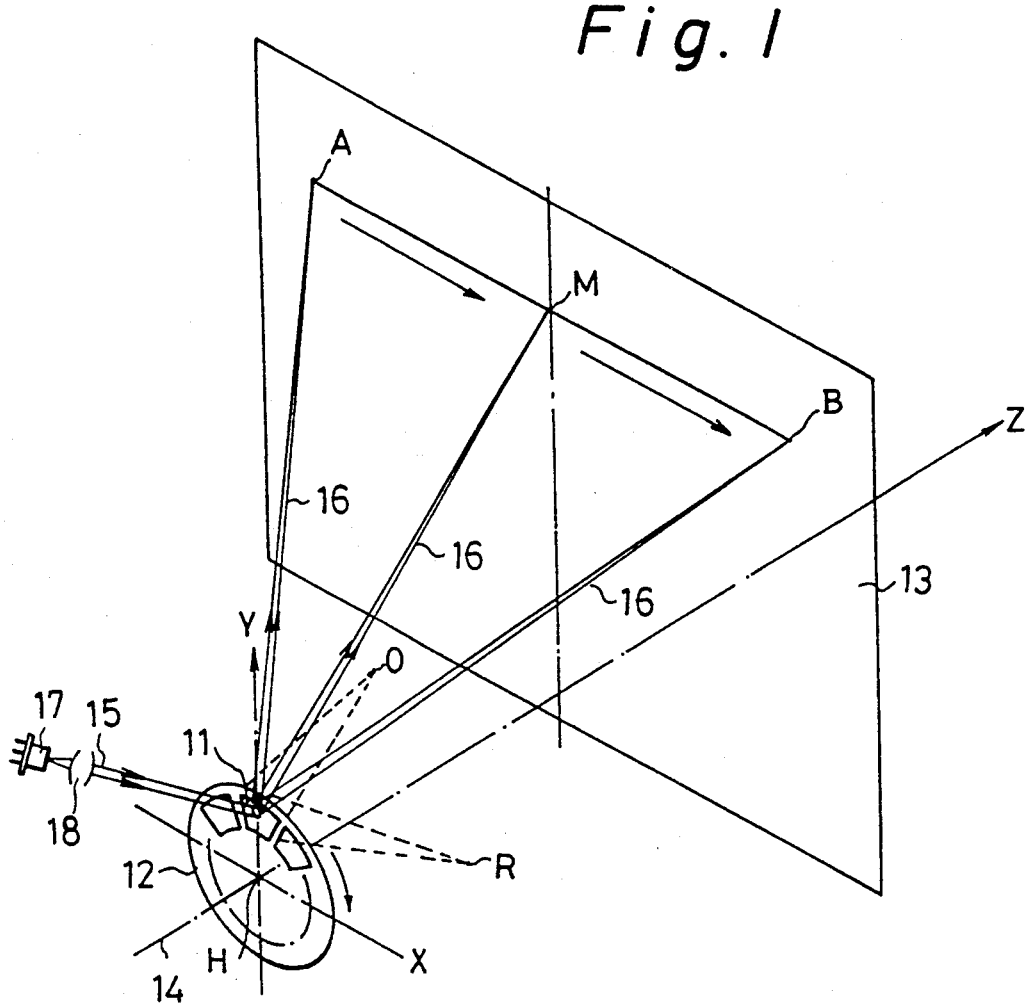
FIG. 1 is a schematic perspective view showing a main portion of a first embodiment of the present invention.
Figure 2:
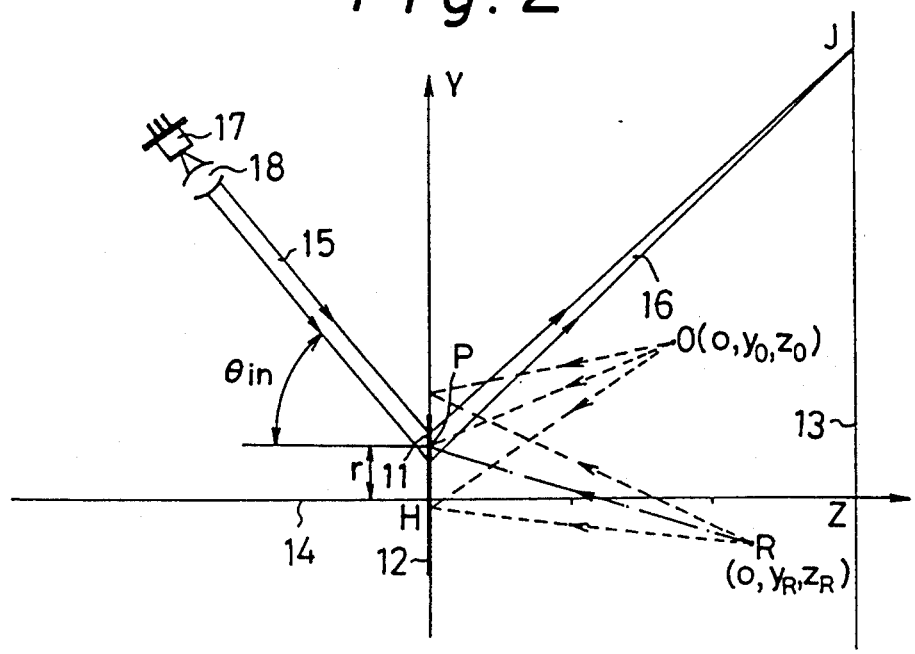
FIG. 2 is a schematic side view of the first embodiment for explaining the optical paths of the recording lights and the reproducing light.

FIG. 1 shows a hologram scanner of a first embodiment according to the present invention. FIG. 2 shows a recording and reproducing condition of the hologram in the first embodiment by the optical paths.

In FIG. 1, the reference numeral 12 designates a hologram disk. A plurality of holograms 11 are arranged on the hologram disk 12 along its circumferential direction. The hologram disk 12 is adapted to rotate around its rotational axis 14. The reference numeral 13 designates an image surface which is scanned by the hologram scanner.

A collimated reproducing light beam 15 in a direction parallel to or crossing the rotational axis 14 is inputted to the hologram 11 from a light source 17 such as a semiconductor light source through a collimator lens 18. The reproducing light beam 15 is deflected by the diffraction effect of the hologram 11 and transmitted as a diffraction light beam 16 toward the image surface 13. The diffraction light beam 16 is focused on the image surface 13, and is moved for scanning as the hologram disk 12 rotates.

A method of recording and reproducing the hologram 11 will be explained below.

In FIG. 1 and FIG. 2, the reference sign H designates a rotational ceneter of the hologram 11. The reference sign J designates a focusing point of the diffraction light beam 16 on the image surface 13. The reference signs O and R designate a center position of an object light source and a center position of a reference light source, respectively.

In the recording process of the hologram 11, assuming that the center H is situated on the original point of the X,Y,Z coordinates system, the rotational axis 14 is situated on the Z axis, and the hologram recording plane of the hologram disk 12 on which the hologram 11 is to be recorded is situated on the XY plane, the focusing ability of the recorded hologram 11 depends on each Z coordinate of each positions O and R, while the deflecting ability of the recorded hologram 11 depends on each X coordinate and each Y coordinate of each positions O and R, respectively.

The Z coordinates of those positions O and R are set to be different from each other so that the diffraction light beam 16 is to be focused on the image surface 13, that is, the focal length of the hologram 11 is to be made substantially same as the distance between the hologram 11 and the image surface 13 in the relationship prescribed by the aforementioned equations (1) and (2). Such a difference of the Z coordinates of the positions O and R can be determined by mathematical programming, an example of which will be descrided later.

Further, the positions O and R as for the X,Y coordinates as well as the Z coordinate are determined by mathematical programming so that the diffraction light beam 16 is to be sufficiently deflected by the hologram 11 in accordance with the rotation of the hologram disk 11, and so that the scan line of the diffraction light beam 16 on the image surface 13 is to be substantially stright line.

For example, in the mathematical programming process, the requested deflecting ability and the focusing ability of the hologram are expressed as functions having design parameters of the positions of the recording optical system and the reproducing opticcal system. Then, by setting the deflecting ability as the constraint and setting the focusing ability as the performance function, the design parameters which gives the minimum value of the performance function under the constraint is turned to be the optimum.

By use of the object light source at the position O thus determined, and the reference light source at the position R of thus determined, the recording process of the hologram 11 is performed. Namely, interference fringes are formed by the mutual interference of these two lights on the hologram recording plane which consists of a photosensitive recording material, so as to record the hologram 11.

Assuming the rotation angle of the hologram 11 is zero, the positions O and R and a reproducing position P should be on the YZ plane including the Z axis in order to make the deflecting angle zero. Thus, only the Y,Z coordinates are to be considered as coordinates of the recording optical system i.e. the object light source and the reference light source.

As those object and reference light sources, for example, an Ar (Argon) laser source with the wave length of 363.8 nm can be preferably used for the hologram scanner in which a semiconductor laser source with the wave length of 780 nm is used as the reproducing light source 17.

Figure 3:
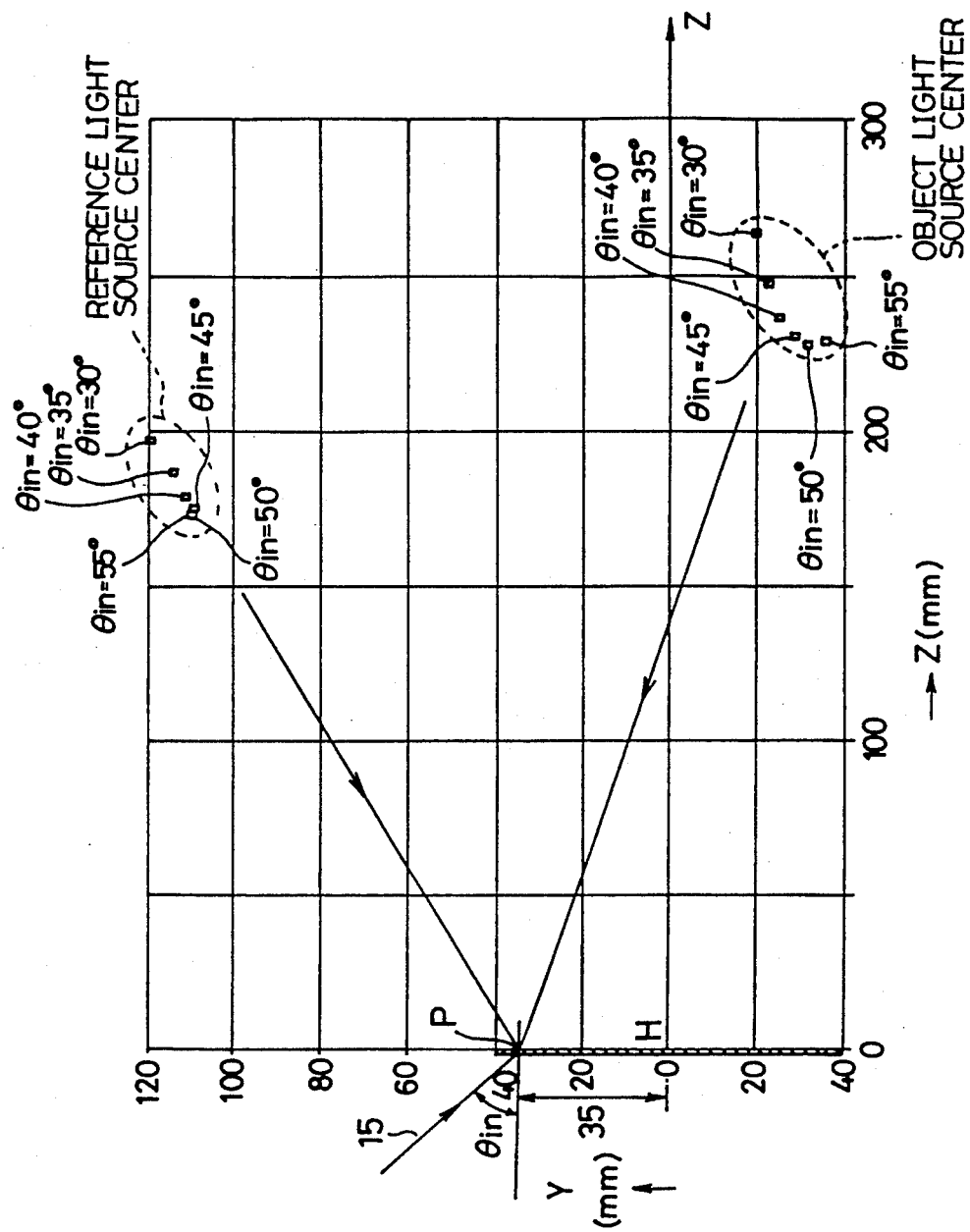
FIG. 3 is a graph showing an example of the optimization of the positions of the recording light sources in the first embodiment.

FIG. 3 shows an example of the optimization of the positions O $(Y_o, Z_o)$ and R $(Y_R, Z_R)$ with respect to the incident angle $\theta_{in}$ by the above mentioned mathematical programming, under the condition that the distance between the hologram disk 12 and the image surface 13 is assumed to be 300 mm. In this example, such a condition is assumed that the distance r between the point P and the center H is 35 mm, twelve holograms 11 are provided on the hologram disk 12, and the diffraction light beam 16 is moved for scanning on the image surface 13 by a scan length of 260 mm every time the reproducing light beam 15 goes across each hologram 11 in company with the rotation of the hologram disk 12.

Figure 4:
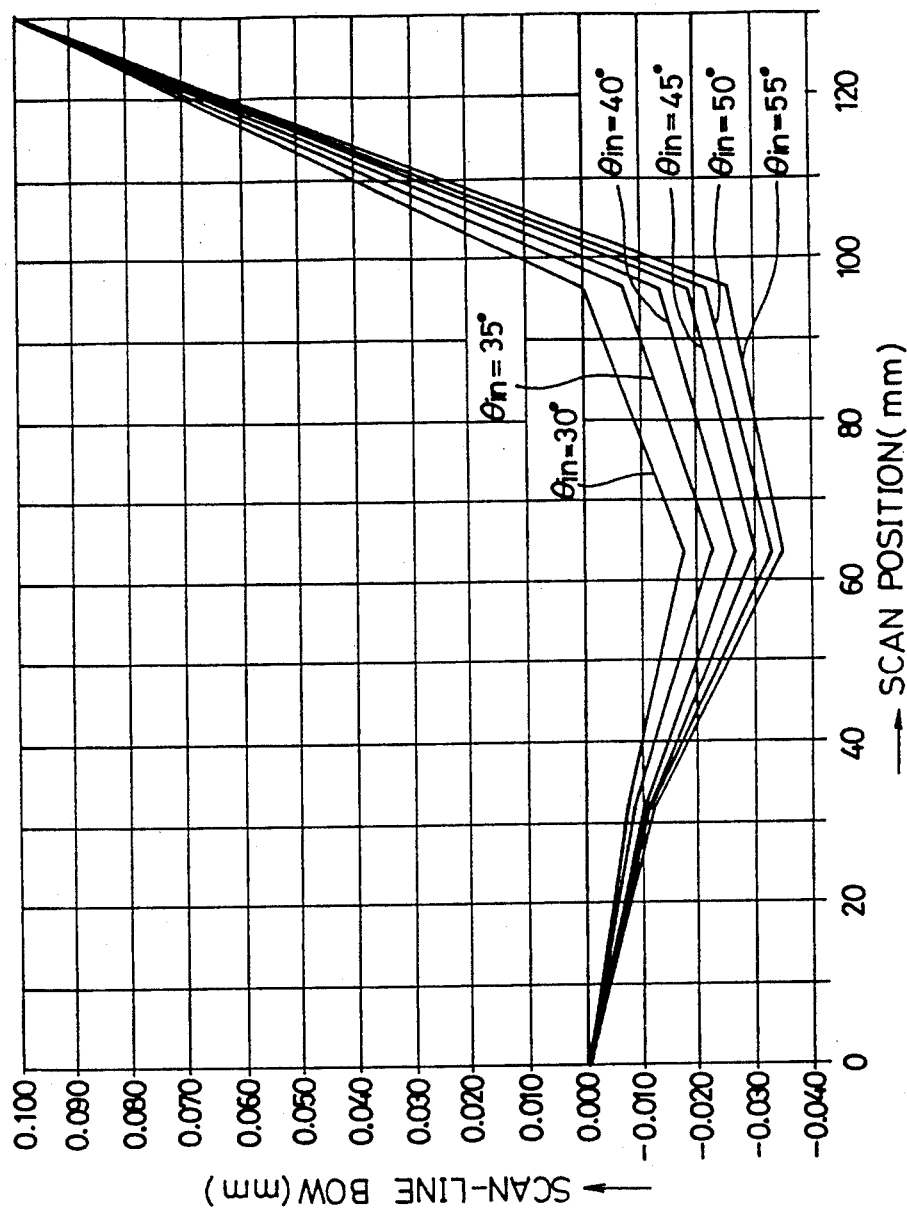
FIG. 4 is a graph showing the scan-line bow, with respect to each incident angle, versus the scan position in the first embodiment.

FIG. 4 shows the scan-line bow of the diffraction light beam 16 on the image surface 13, with respect to each incident angle $\theta_{in}$, versus the scan position on the iamge surface 13. In FIG. 4, a position of the scan position O corresponds to the scan center. According to FIG. 4, the scan-line bow is within as little as 0.1 mm.

Figure 5:
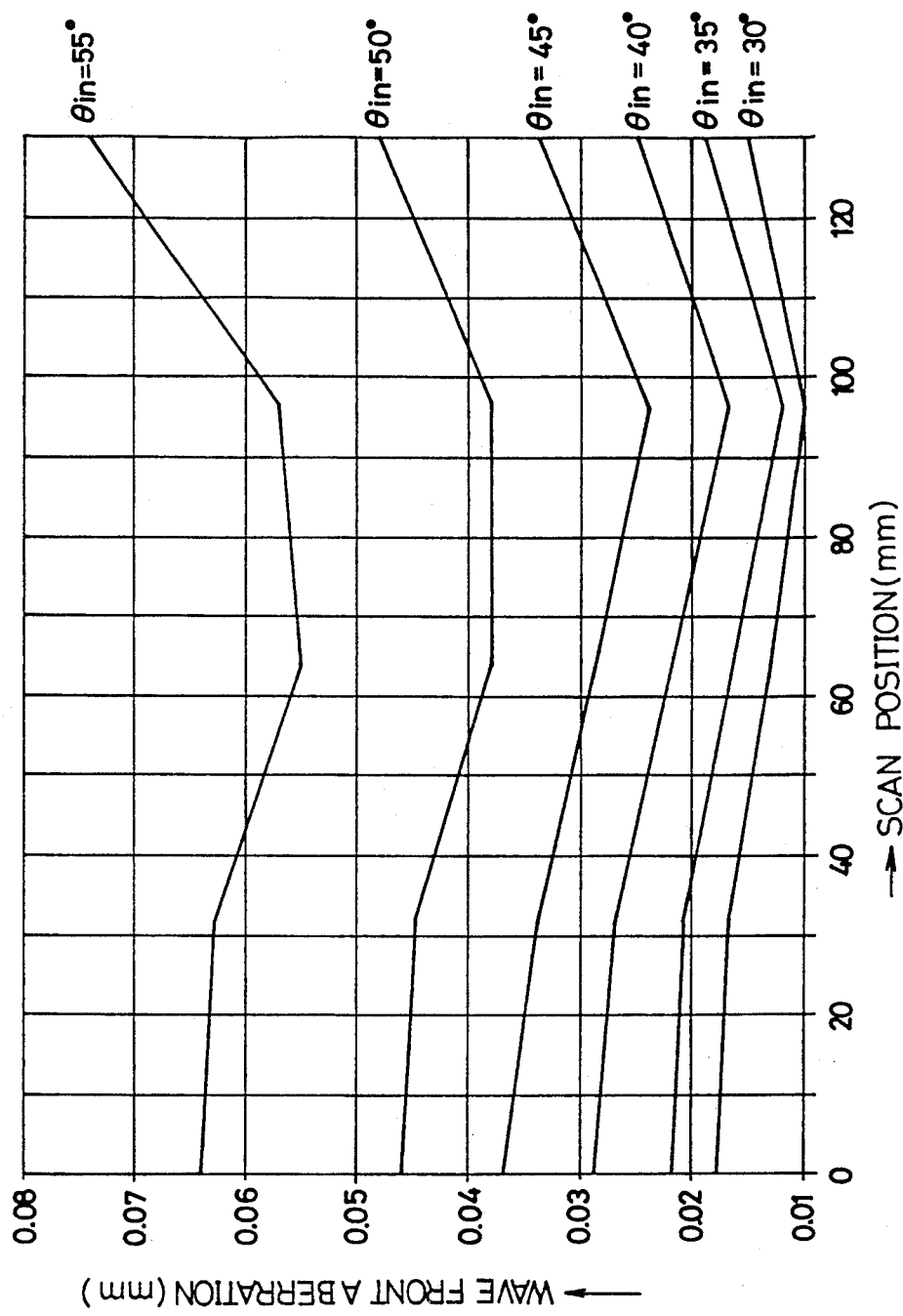
FIG. 5 is a graph showing the wavefront aberration with respect to each incident angle, versus the scan position in the first embodiment.

FIG. 5 shows the change of each RMS (effective value) wavefront aberration at the image surface 13 with respect to each incident angle $\theta_{in}$, versus the scan position on the image surface 13. According to FIG. 5, the RMS wavefront aberration is within $\lambda/14$ i.e. within the tolerance of the RMS wavefront value defined as the SD (Strehl's Definition) value is not less than 80%. That is to say, the diffraction light beam 16 having a small wavefront aberration can be obtained with respect to the whole portion of the scan line.

Figure 6:
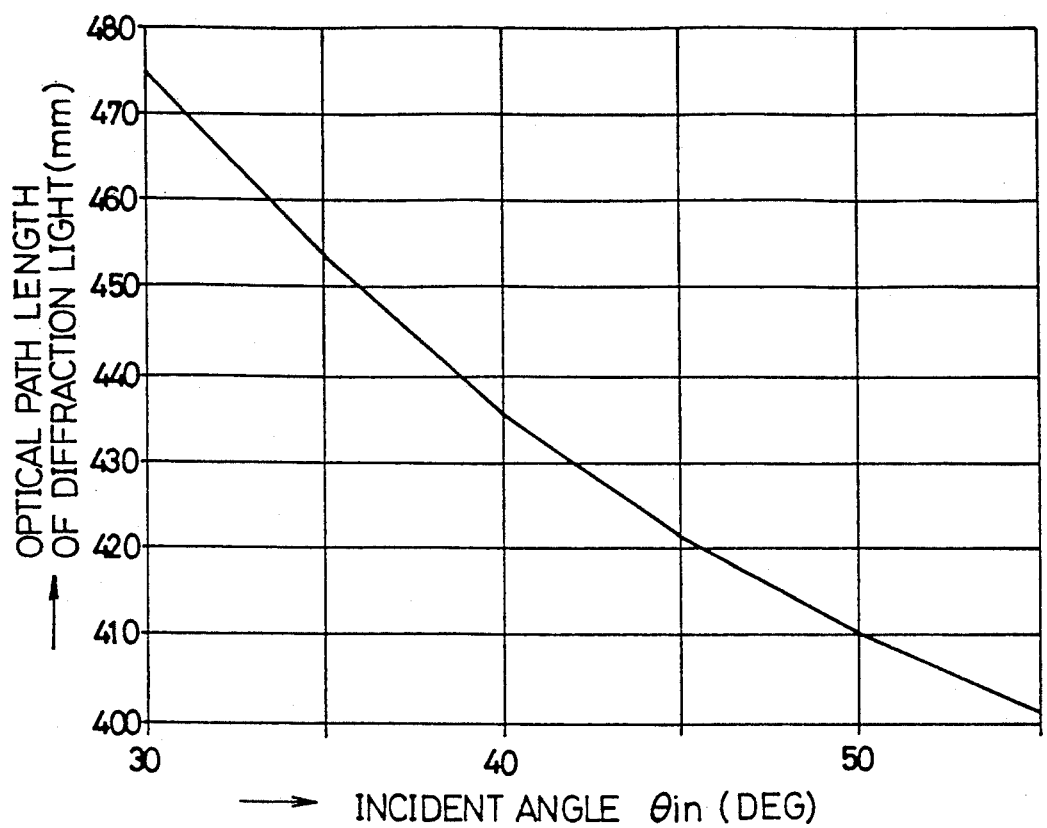
FIG. 6 is a graph showing a relationship between the incident angle and the optical path length in the first embodiment.

FIG. 6 shows a relationship between the incident angle $\theta_{in}$ of the reproducing light beam 15 and the optical path length of the diffraction light beam 16 at the scan center. According to FIGS. 5 and 6, the wavefront aberration increases and the optical path length reduces as the incident angle $\theta_{in}$ increases. The incident angle $\theta_{in}$ is related to the diffraction efficiency, and it is desirable to set the incident angle $\theta_{in}$ at an angle close to the Bragg angle $\theta_B$ in order to obtain a high diffraction efficiency.

The Bragg angle $\theta_B$ is expressed by a following equation (3), where d represents the pitch of the interfernce finges of the hologram and $\lambda_2$ represents the wave length of the reproducing light beam 15.

$$\theta_B = \sin^{-1}(\lambda_2/(2d)) \qquad (3)$$

By use of the equation (3), the Bragg angle $\theta_B$ is calculated from the pitch d as for the hologram optimized by the aforementioned mathematical programming in its recording process with respect to each incident angle $\theta_{in}$.

Figure 7:
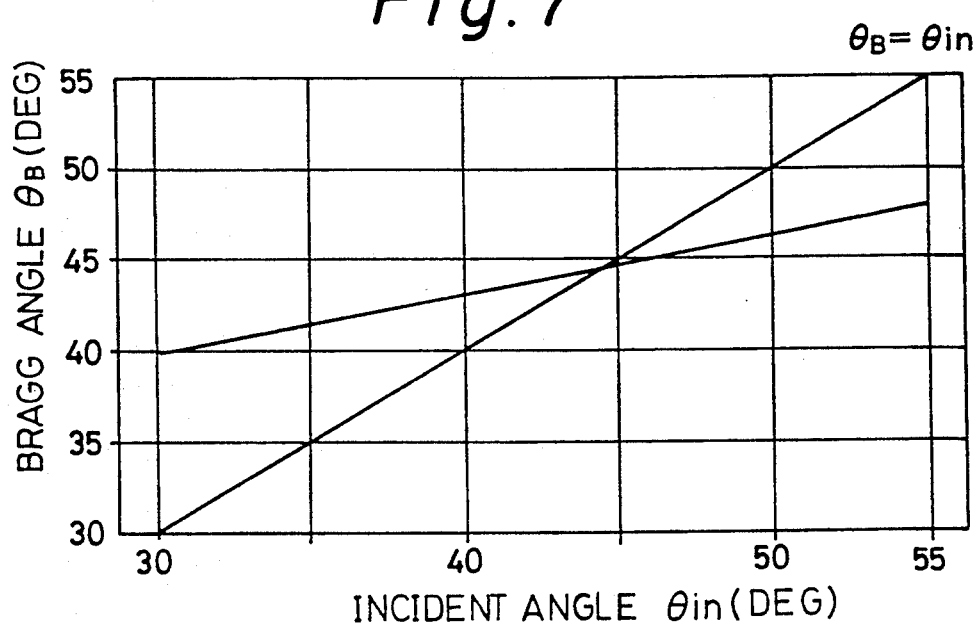
FIG. 7 is a graph showing the Bragg angle versus the incident angle in the first embodiment.

FIG. 7 shows the thus calculated Bragg angle $\theta_B$ versus the incident angle $\theta_{in}$. According to FIG. 7, the incident angle $\theta_{in}$ coincides with the Bragg angle $\theta_B$ when the $\theta_{in}$ is about 45 degrees.

Consequently, the incident angle $\theta_{in}$ is preferably determined by taking into consideration the RMS wavefront aberration, the optical path length and the Bragg angle conditions.

As described above, in the first embodiment of the present invention, because of the prescribed difference between the Z coordinates of the positions O and R in the recording process, the focusing ability as well as the deflecting ability can be given to the hologram 11, with repsect to the reproducing light beam 15 of a collimated type in the reproducing operation. Further because of the prescribed positioning of the positions O and R in the recording process, the reproducing light beam 15 inputted to the hologram 11 by an incident angle $\theta_{in}$ can be focused on the image surface 13 as the diffraction light beam 16, and the diffraction light beam 16 can be straightly moved on the image surface 13 in the reproducing operation.

Figure 8:
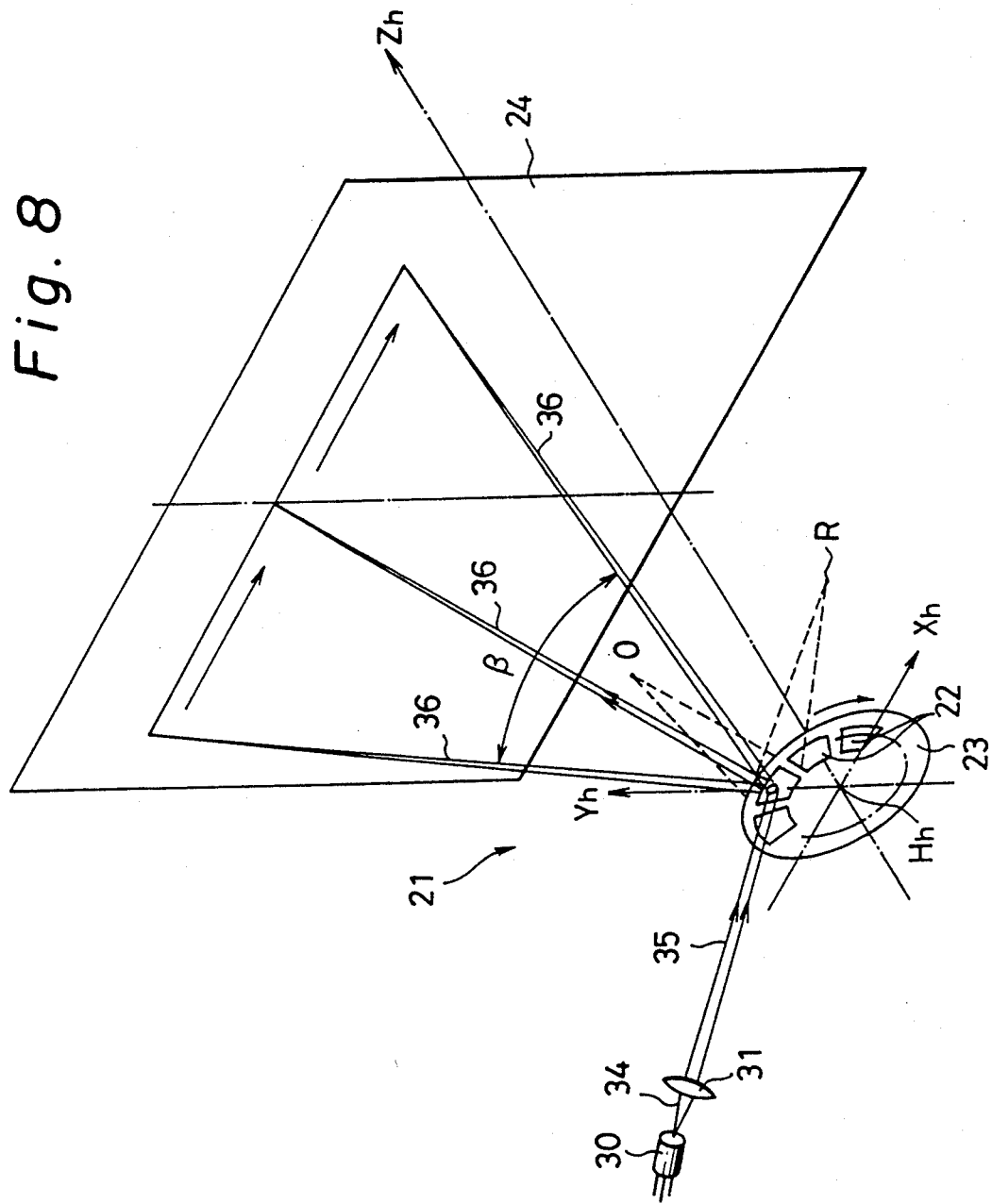
FIG. 8 is a schematic perspective view showing a main portion of a second embodiment of the present invention.

FIG. 8 shows a second embodiment of the present invention.

In FIG. 8, a hologram scanner 21 is provided with a hologram disk 23 on which a plurality of holograms 22 are arranged along its circumferential direction. The hologram disk 23 is rotated at a prescribed speed by a motor (not shown).

A semiconductor laser source 30 emits a light beam 34. The light beam 34 is collimated by a collimator lens 31 and then inputted to the hologram 22 as a reproducing light beam 35 of a collimated type.

When the hologram disk 23 rotates, the reproducing light beam 35 is deflected by the diffraction effect of the hologram 22, and made into a diffraction light beam 36.

The hologram 22 has a focusing ability as well as a deflecting ability. Thus, the deflected diffraction light beam 36 is focused on the image surface 24, and is moved for scanning along a main scanning direction (Xh direction) as indicated by an arror on the image surface 24. On the other hand, the image surface 24 is moved in a sub-scanning direction (Yh direction) perpendicular to the main scanning direction, so as to perform a sub-scanning operation.

Here, the hologram 22 has interference fringes different from quadratic curves and is recorded by a mutual interference of an object light and a reference light, at least one of which is an aberrational wave, which is generated by inputting a spherical wave to an anamorphic lens which power distribution is determined by mathematical programming so that an aberration of the diffraction light beam 36 on the image surface 24 is minimized, as described later.

Consequently, the aberration in the main and sub-scanning directions of the diffraction light beam 36 on the image surface 24 is effectively diminished and the size of the light spot formed by the diffraction light beam 36 on the image surface 24 is made small.

In FIG. 8, the Xh, Yh, Zh coordinates system, which origin is coincident with a rotational center point Hh of the hologram disk 23 is shown, and positions O and R, which are the positions of the object light source and the reference light source respectively in the recording process of the hologram 22, and a deflection angle $\beta$ of the diffraction light beam 36 are also shown.

The recording and manufacturing process of the hologram 22 will be explained below.

Figure 9:
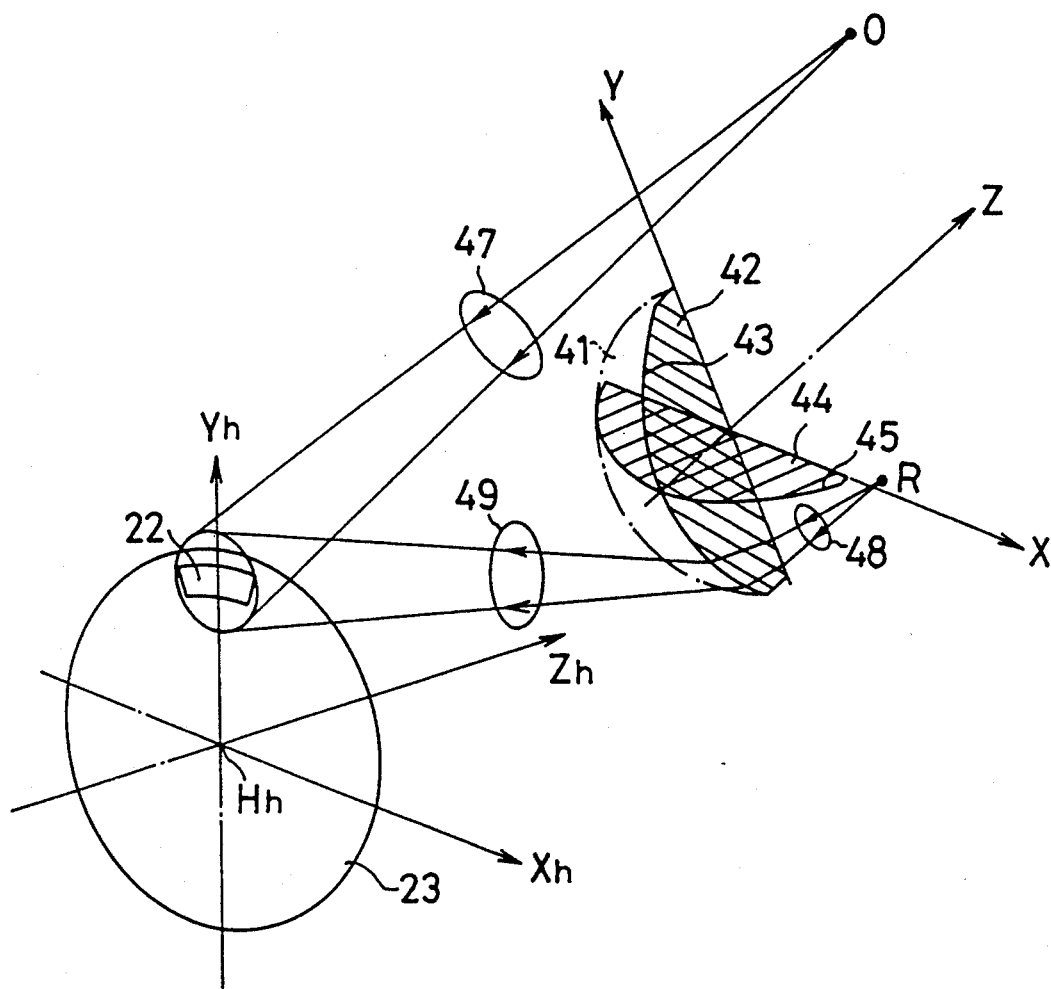
FIG. 9 is a schematic perspective view showing an optical system for recording the hologram in the second embodiment.

FIG. 9 shows the optical arrangements in the recording process of the hologram 22.

In FIG. 9, an anamorphic lens 41 is a lens in which a ridgeline 43 on a meridional plane profile 42 and a ridgeline 45 on a sagittal plane profile 44 are different from each other.

A divergent spherical wave 47 is emitted as an object light toward the hologram disk 23, on which the hologram 22 is to be recorded. A divergent spherical wave 48 from the position R passes through the anamorphic lens 41 so as to become an aspherical wave 49 including an aberration as a reference light.

The hologram 22 is recorded and manufactured by the mutual interference of the spherical wave 47 and the aspherical wave 49. At this time, the optimum power distribution of the anamorphic lens 41 and the optimum incident position of the spherical wave 48 to the anamorphic lens 41 are determined by mathematical programming method so that the ability of the hologram 22 to cancel the aberration of the diffraction light beam 36 is maximized at the image surface 24 in the reproducing operation, as explained later.

The anamorohic curved surface of the anamorphic lens 41 can be expressed by a trailing amount Z from the apex of the quadratic curved surface in the X,Y,Z coordinates system which origin is coincident with the ceneter point H of the second surface of the anamorphic lens 41 as shown in FIG. 9. Namely, the anamorphic curve surface can be expressed by the following equation (4).

$$Z = \frac{C_x X^2 + C_y Y^2}{1 + \sqrt{1 - (1 + K_x)C_x^2 X^2 - (1 + K_y)C_y^2 Y^2}} + \quad (4)$$

$$a_4\{(1 - k_4)X^2 + (1 + k_4)Y^2\}^2 + a_6\{(1 - k_6)X^2 + (1 + k_6)Y^2\}^3 +$$

$$a_8\{(1 - k_8)X^2 + (1 + k_8)Y^2\}^4 + a_{10}\{(1 - k_{10})X^2 +$$

$$(1 + k_{10})Y^2\}^5 + \ldots$$

Wherein, if the anamorphic curved surface is a curved surface, in which each of the YZ profile and the XZ profile is in a circular shape and has a curvature different from each other, the relevant parameters are as following.

$a_4 = a_6 = a_8 = a_{10} = 0$ $K_x = K_y = 0$ $C_x \neq C_y$

If the anamorphic curved surface is a curved surface, in which the YZ profile is in a circular shape while the XZ profile is in a quadratic curve shape other than a circlar shape, the relevant parameters are as following.

$a_4 = a_6 a_8 = a_{10} = 0$ $K_x \neq 0, K_y = 0$

If the anamorphic curved surface is a curved surface, in which the YZ profile is in a circular shape while the XZ profile is in a shape of polynominal of higher order other than a circle, the relevant parameters are as folllowing.

$a_4 \neq 0, a_6 \neq 0, a_8 \neq 0, a_{10} \neq 0$ $k_4 = k_6 k_8 = k_{10} = -1$ $K_x \neq 0, K_y = 0$ If the anamorphic curved surface is a curved surface, in which each of the YZ profile and the XZ profile is in a shape of quadratic curve other than a circle, the relevant parameters are as following.

$a_4 = a_6 = a_8 = a_{10} = 0$ $K_x \neq 0, K_y \neq 0$

If the anamorphic curved surface is a curved surface, in which each of the YZ profile and the XZ profile is a shape of polynominal of higher order other than a circle, the relevant parameters are as following.

$a_4 \neq 0, a_6 \neq 0, a_8 \neq 0, a_{10} \neq 0$ $k_4 \neq 1, k_6 \neq 1, k_8 \neq 1, k_{10} \neq 1$ $k_4 \neq -1, k_6 \neq -1, k_8 \neq -1, k_{10} \neq -1$ A design of the anamorphic lens 41 and the optical arrangement will be explained hereinbelow, taking such an example that the hologram 22 is recorded by use of the anamorphic lens 41 of a plane convex type having an anamorphic surface at the first surface and a flat plane surface at the second surface.

Figure 10:
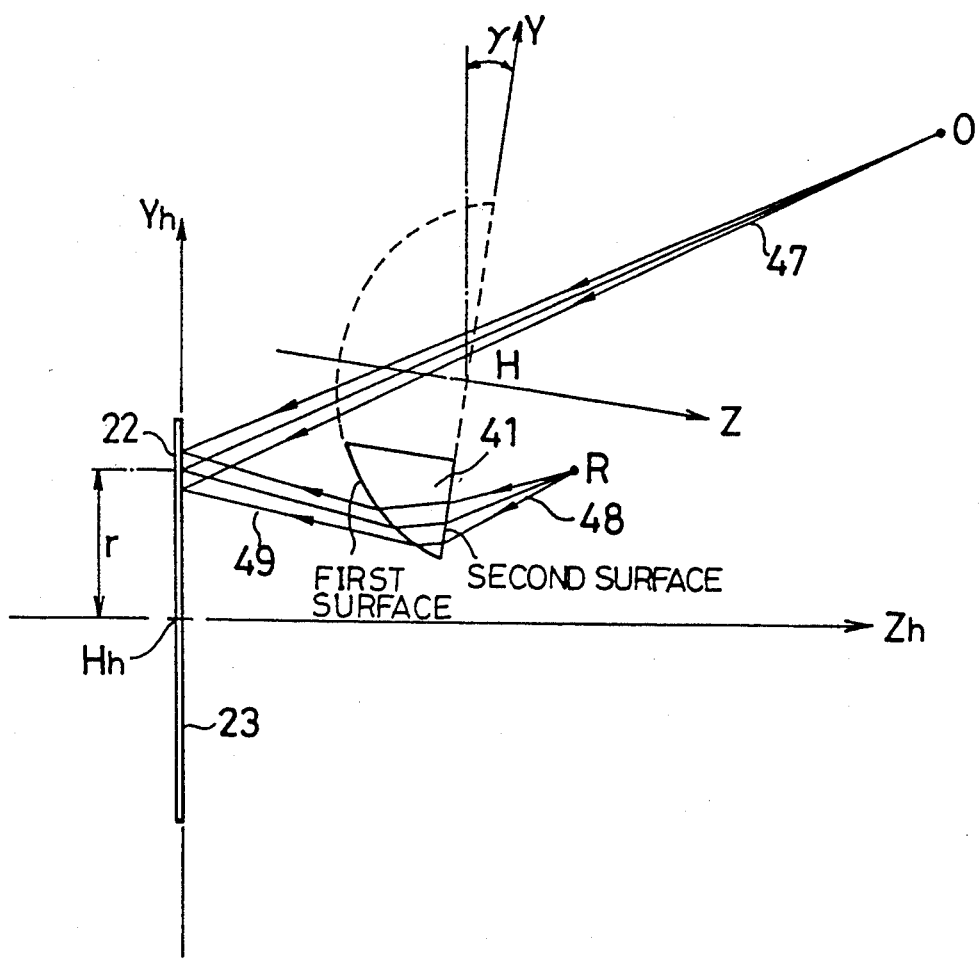
FIG. 10 is a schematic cross-sectional view of the recording optical system of FIG. 9.

FIG. 10 shows the profile of the anamorphic lens 41 which power distribution is determined by mathematical programming method as described later, in the direction from the meridional plane profile 42 (YZ profile) of FIG. 9.

In this example, each of the meridional plane profile 42 (YZ profile) and the saggital plane profile 44 (XZ profile) is in a shape of polynominal of higher order different from each other, wherein the relevant parameters in shape are set as following.

| | | | |
|---|---|---|---|
| $C_x$ | $3.80657 \times 10^{-2}$ | | |
| $C_y$ | $2.42545 \times 10^{-2}$ | | |
| $K_x$ | $-0.41006$ | $K_y$ | 0 |
| $k_4$ | 0.13642 | $k_6$ | $-0.19083$ |
| $k_8$ | 0.76992 | $k_{10}$ | 0.53379 |
| $a_4$ | $2.91059 \times 10^{-6}$ | | |
| $a_6$ | $-7.05783 \times 10^{-10}$ | | |
| $a_8$ | $1.78332 \times 10^{-13}$ | | |
| $a_{10}$ | $3.07495 \times 10^{-16}$ | | |

The optical arrangement of the recording light sources etc. expressed in the Xh, Yh, Zh coordinates system are set as following.

point O (0, 91.352, 144.222)
point R (0, 28.465, 73.399)
distance r 28 mm
point H (0, 54.617, 45.166)
angle γ 8.6°

As the material of the anamorphic lens 41, a compound fused silica may be preferably used. As the spherical waves 47 and 48, an argon laser may be preferably used which has a wave length of 363.8 nm for example.

Figure 11:
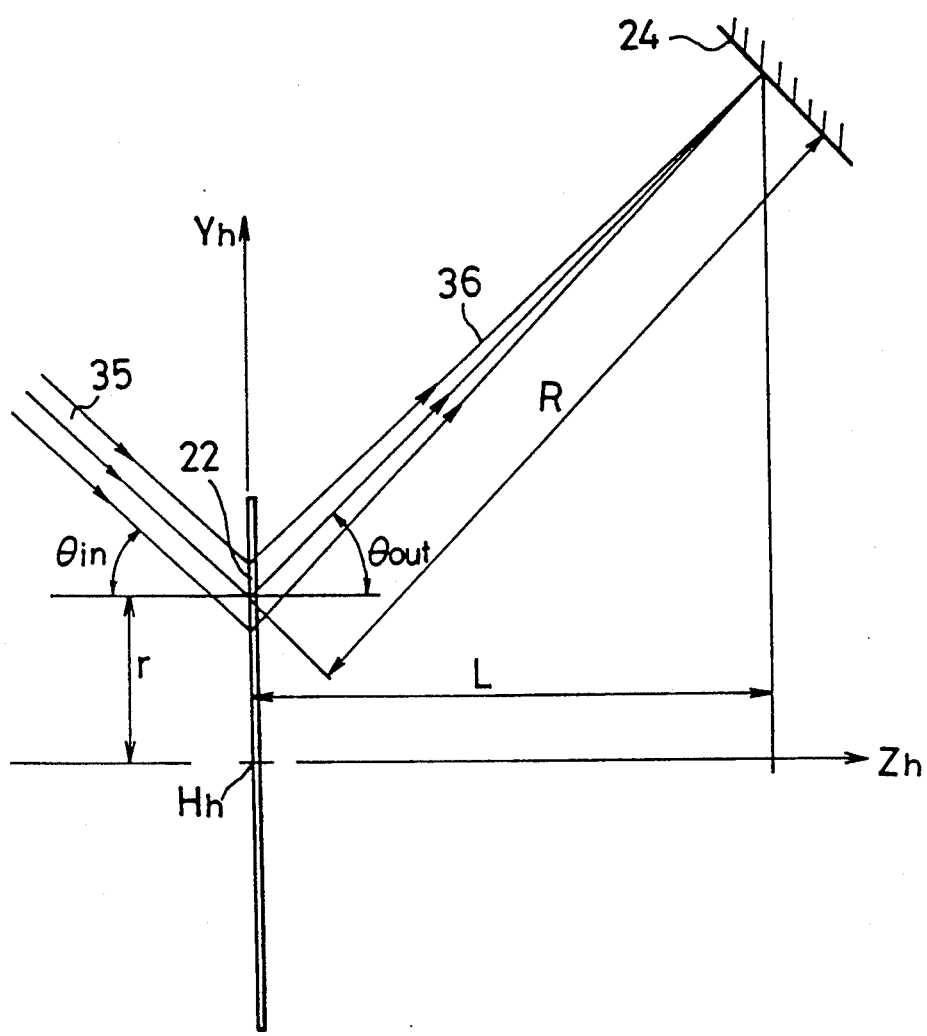
FIG. 11 is a schematic cross-sectional view of an optical system for reproducing the hologram of FIG. 10.

FIG. 11 shows the optical system arrangement from the side of the hologram disk 23 in the reproducing operation of the hologram 22 recorded in the above described manner.

In FIG. 11, the reproducing light beam 35 is, for example, a semiconductor laser beam having a wave length of 787.5 nm.

In FIG. 11, the relevant distances and angles are set as following.

| | |
|---|---|
| distance r | 28 mm |
| angle $\theta_{in}$ | 43.2° C. |
| angle $\theta_{out}$ | 44.2° C. |
| distance L | 199 mm |
| distance R | 280 mm |

FIGS. 12a to 12d show the transverse aberration of the diffraction light beam 36 at the image surface 24 in the reproducing operation of the hologram 22.

In each of FIGS. 12a to 12d, for a purpose of comparison, the transverse aberration generated in a reproducing operation of a hologram which is recorded by use of non-aberrational spherical waves as recording waves, is also shown by a line a. The transverse aberration, in the case of the hologram 22 recorded by use of the aberrational wave which is produced by the anamorphic lens 41, is shown by a line b.

Figure 12A:
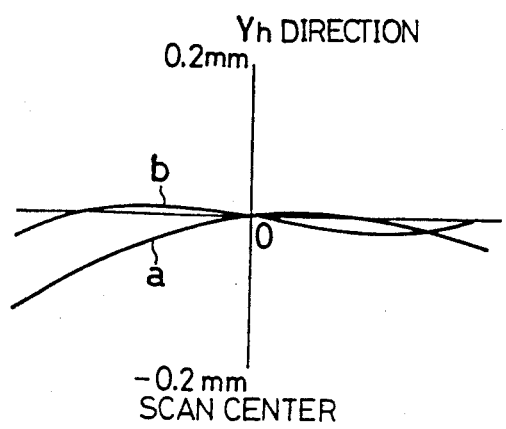
FIGS. 12a to 12d are transverse aberration characteristic curves at an image surface in the reproducing operartion of the hologram of FIG. 11.
Figure 12B:
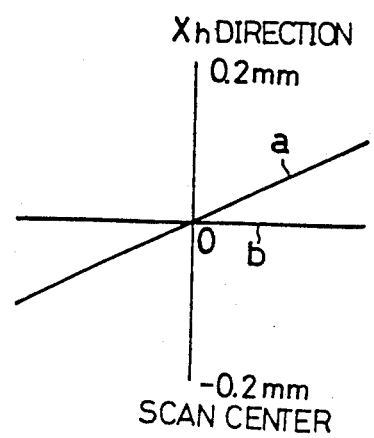

FIGS. 12a and 12b show the transverse aberration in the Yh direction and Xh direction respectively at the scan center of the diffraction light beam 36.

Figure 12C:
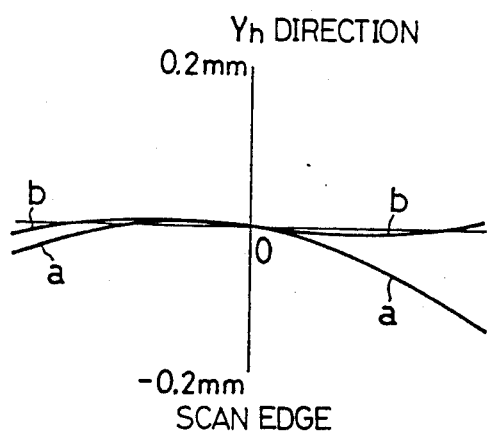
Figure 12D:
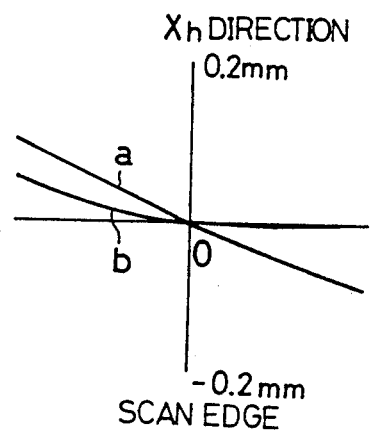

FIGS. 12c and 12d show the transverse aberration in the Yh direction and Xh direction respectively at the scan edge of the diffraction light beam 36.

From the FIGS. 12a to 12d, it is understood that the transverse aberration in both of the Xh and Yh directions at the scan center and at the scan edge are effectively corrected according to the present embodiment.

In the above described second embodiment, the anamorphic lens 41 is constructed such that each of the meridional plane profile 42 and the saggital plane profile 44 is in the shape of the polymnomial of higher order. This shape is not, however, indispensable. Instead, the anamorphic lens of various shapes may be utilized to produce the aberrational aspherical wave as the object light or the reference light in the recording process of the hologram.

Namely, for examle, each of the sagittal plane profile and the meridional plane profile of the anamorphic lens may be in a circular shape, which curvature is different from each other.

Alternatively, one of the sagittal plane profile and the meridional plane profile of the anamorphic lens may be in a circular shape while the other may be in a quadratic curve shape other than a circular shape.

Alternatively, one of the sagittal plane profile and the meridional plane profile of the anamorphic lens is in a circular shape while the other is in a shape of polynominal of higher order other than a circular shape.

Alternatively, each of the sagittal plane profile and the meridional plane profile of the anamorphic lens is in a quadratic curve shape other than a circular shape.

As described above, according to the second embodiment of the present invention, the hologram 22 having both of the sufficient deflecting ability and the sufficient focusing ability can be recorded by a relatively simple optical recording system, and can be reproduced by a collimated reproducing light beam 15.

A third embodiment of the present invention will be described below, with referring to FIGS. 13 to 17.

The hologram scanner of the third embodiment has a similar structure as the second embodiment, but the third embodiment is provided with a hologram, which has interference fringes different from quadratic curves and is recorded by a mutual interference in a different manner. Namely, in the third embodiment, the reference light is an aberrational wave which is generated by inputting a spherical wave to a compound optical system including a prism and a spherical lens which parameters in shape are determined by mathematical programming as described later, so that an aberration of a diffraction light beam in the reproducing operation on an image surface is minimized. That is to say, in the third embodiment, the compound optical system is utilized in place of the anamorphic lens of the second embodiment. Consequently, the aberration in the main and sub-scanning directions of the diffraction light beam in the reproducing operation on the image surface is effectively diminished and the size of the light spot formed by the diffraction light beam on the image surface is made small in a similar manner as the second embodiment.

The recording and manufacturing process of the hologram of the third embodiment will be explained below.

Figure 13:
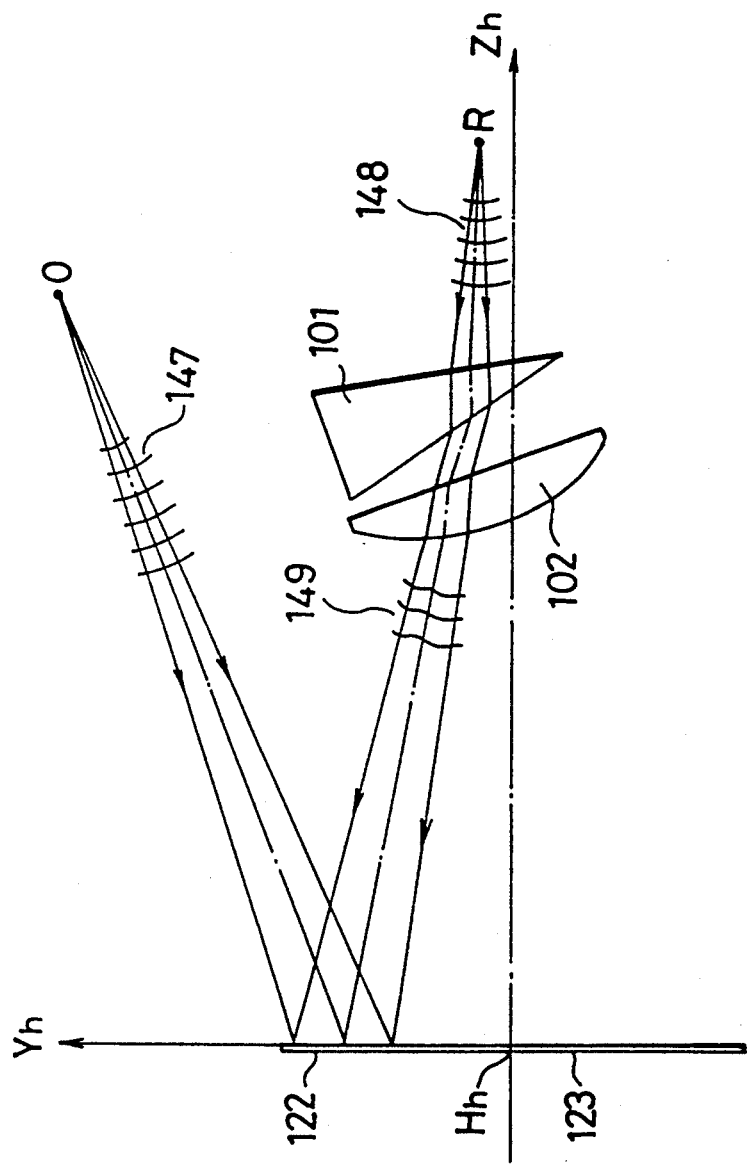
FIG. 13 is a schematic perspective view showing an optical system for recording a hologram in a third embodiment.

FIG. 13 shows the optical system arrangement for recording a hologram 122 of the third embodiment.

In FIG. 13, a divergent spherical waves 147 and 148 of laser beams are emitted from the positions O and R respectively toward the hologram disk 123. Here, the spherical wave 148 is transmitted through a prism 101 and a spherical lens 102 and becomes an aspherical wave 149 including an aberration as the reference light. The spherical wave 147 is directly irradiated onto the hologram disk 123 as the object light.

The hologram 122 is recorded by the mutual interference of the spherical wave 147 and the aspherical wave 149. In FIG. 13, the Xh,Yh,Zh coordinate system having its original at a rotation center point Hh of the hologram disk 123, is shown.

The parameters in shape and the positions of the prism 101 and the spherical lens 102, and the incident positions of the spherical waves 147 and 148 are determined by mathematical programming so that the effect to cancel the aberration of the reproducing light beam in the reproducing operation of the hologram 122 is to be maximized.

Figure 14:
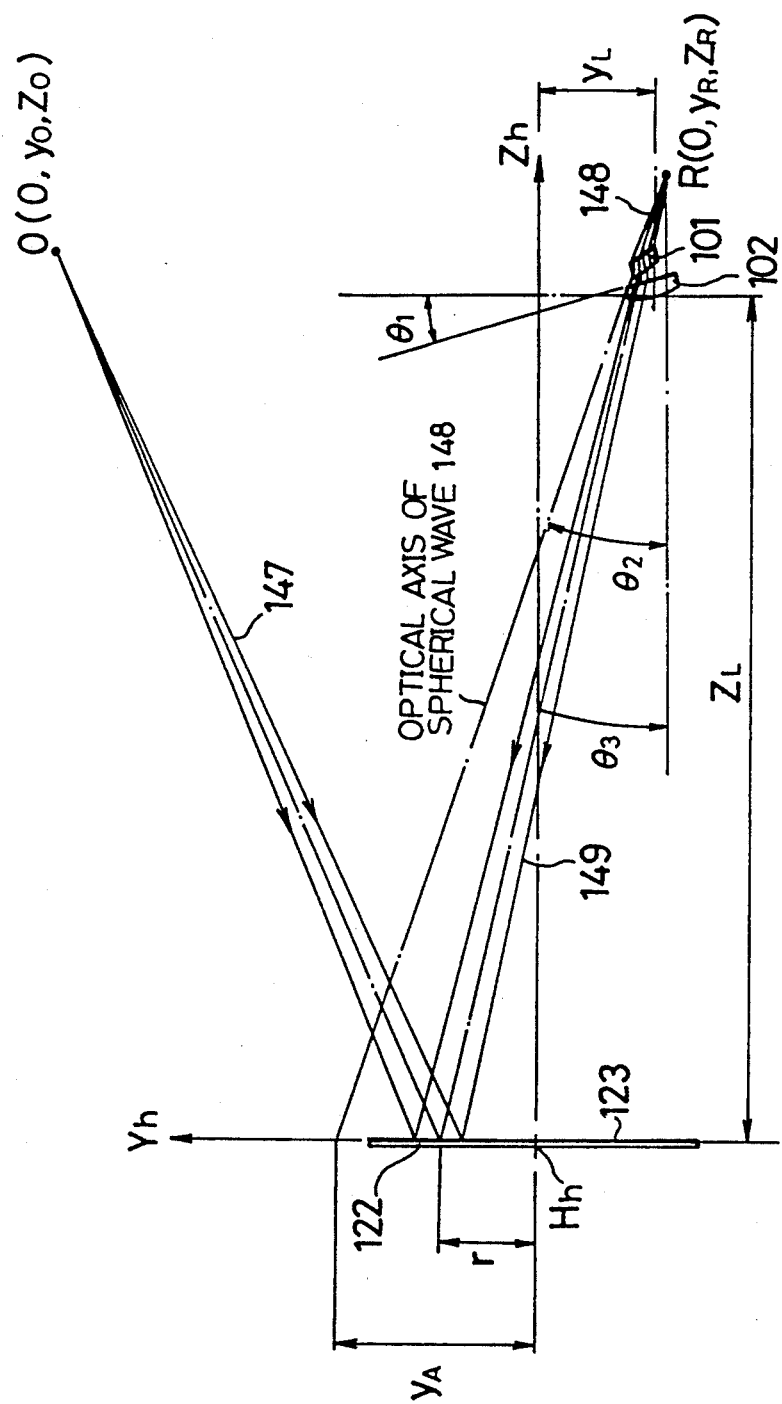
FIG. 14 is a schematic cross-sectional view of the recording optical system of FIG. 13.

FIG. 14 shows a recording optical system for the hologram 122 with a scan width of 210 mm and a resolution of 300 dip for example.

In FIG. 14, the coordinates of the positions O and R are $(O,Y_o,z_o)$ and $(O,Y_r,z_r)$ respectively, while the relevant coordinates, distances and angles are set as following.

| | | | |
|---|---|---|---|
| $y_0$ | 148.94 mm | $z_0$ | 264.54 mm |
| $y_R$ | −37.15 mm | $z_R$ | 279.84 mm |
| distance $y_L$ | | −33.58 mm | |
| distance $z_L$ | | 243.24 mm | |
| distance $y_A$ | | 61.83 mm | |
| distance r | | 30.00 mm | |
| angle $\theta_1$ | | 17.14° | |
| angle $\theta_2$ | | 19.48° | |
| angle $\theta_3$ | | 13.37° | |

Figure 15:
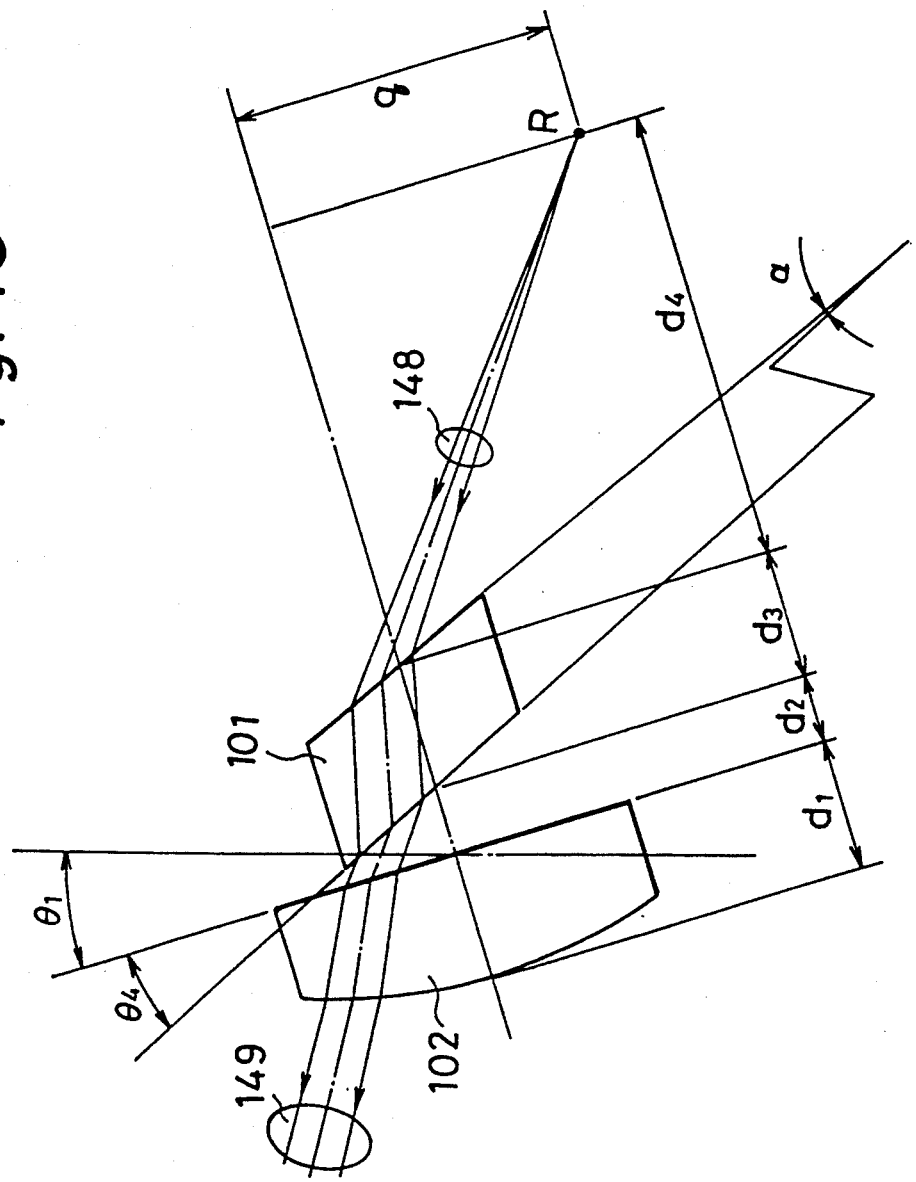
FIG. 15 is a schematic magnified cross-sectional view of an example of the recording optical system of FIG. 14.

FIG. 15 shows a magnified figure of the prism 101 and the spherical lens 102.

In FIG. 15, the relevant angles and distances are as following.

| | | | |
|---|---|---|---|
| angle $\theta_4$ | 25.24° | angle $\alpha$ | 1.85° |
| distance $d_1$ | 5.70 mm | distance $d_2$ | 2.92 mm |
| distance $d_3$ | 5.49 mm | distance $d_4$ | 19.81 mm |
| distance q | 14.20 mm | | |

The spherical lens 102 consists of a plane convex lens with a focal length of 50 mm. The material of the spherical lens 102 and the prism 101 is, for example, a compound fused silica. The spherical waves 147 and 148 consists of an argon laser with a wave length of 363.8 nm, for example.

Figure 16:
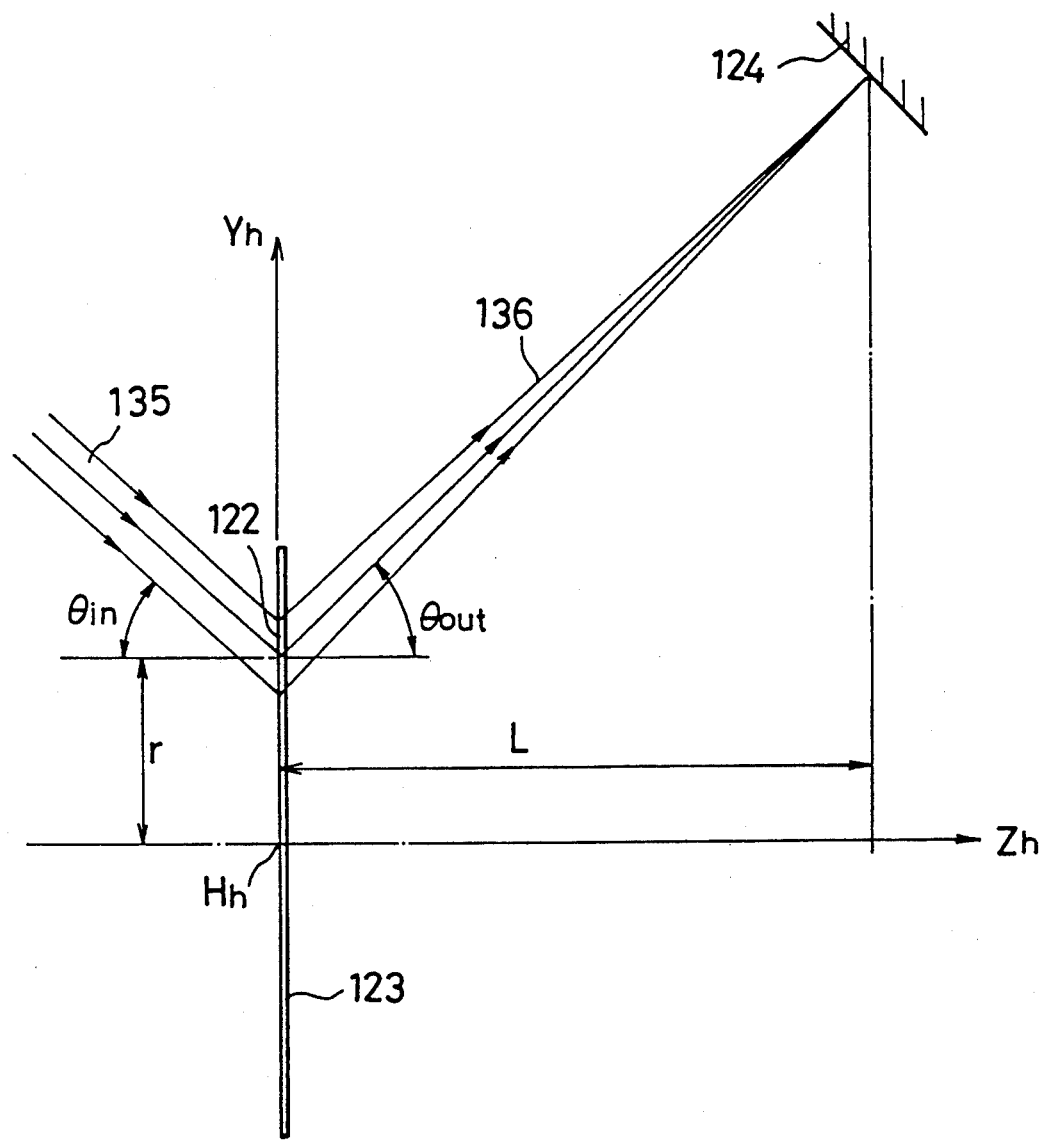
FIG. 16 is a schematic cross-sectional view of an optical system for reproducing the hologram of FIG. 14.

FIG. 16 shows an optical system for reproducing the hologram 122.

In FIG. 16, the reproducing light beam 135 is, for example, a semiconductor laser beam with a wave length of 787.5 nm.

In FIG. 16, the relevant distances and angles are set as following.

| | |
|---|---|
| distance r | 30 mm |
| angle $\theta_{in}$ | 43.2° |
| angle $\theta_{out}$ | 44.7° |
| distance L | 357 mm |

In the hologram scanner of the present embodiment, the scanning operation is performed by rotating at a prescribed speed the hologram disk 123, on which a plurality of the holograms 122 are arranged along its circumferential direction, and by deflecting the diffraction light beam 136 so as to scan the image surface 124.

FIGS. 17a to 17d show the transverse aberration of the diffraction light beam 136 at the image surface 124 in the reproducing operation of the hologram 122.

In each of FIGS. 17a to 17d, for a purpose of comparison, the transverse aberration generated in a reproducing operation of a hologram which is recorded by use of non-aberrational spherical waves as recording waves, is also shown by a line a. The transverse aberration, in the case of the hologram 122 recorded by use of the aberrational wave which is produced by the prism 101 and the spherical lens 102, is shown by a line b.

Figure 17A:
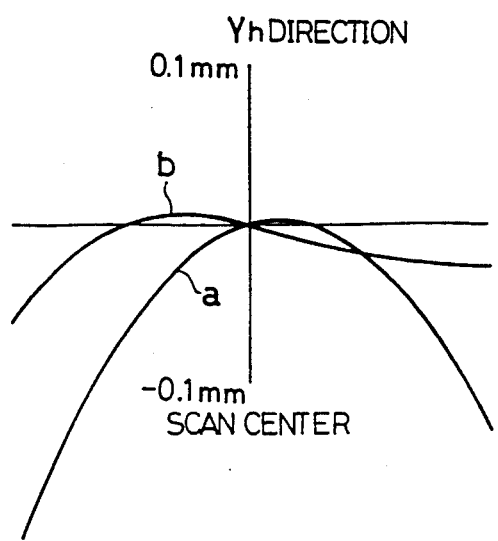
FIGS. 17a to 17d are transverse aberration characteristic curves at an image surface in the reproducing operartion of the hologram of FIG. 14.
Figure 17B:
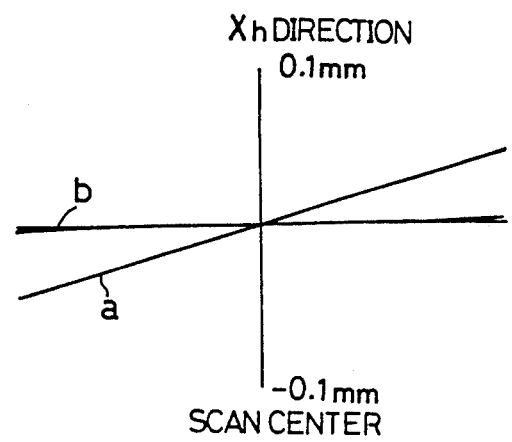

FIGS. 17a and 17b show the transverse aberration in the Yh direction and Xh direction respectively at the scan center of the diffraction light beam 136.

Figure 17C:
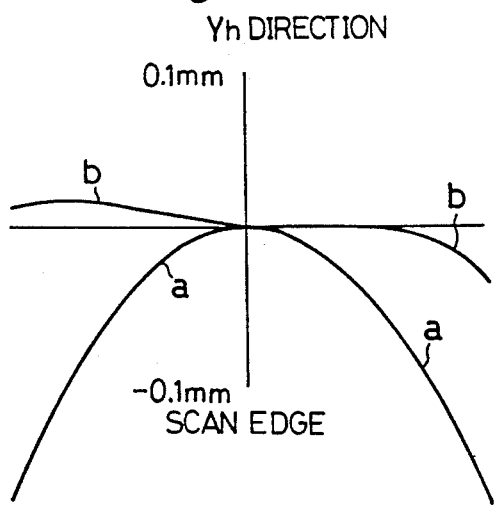
Figure 17D:
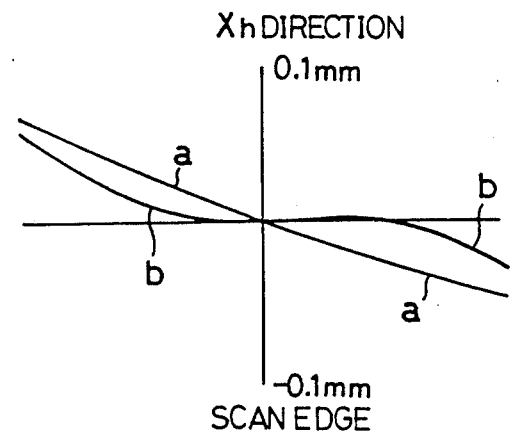

FIGS. 17c and 17d show the transverse aberration in the Yh direction and Xh direction respectively at the scan edge of the diffraction light beam 136.

From the FIGS. 17a to 17d, it is understood that the transverse aberration in both of the Xh and Yh directions at the scan center and at the scan edge are effectively corrected according to the present embodiment.

As described above, according to the third embodiment of the present invention, the hologram 122 having both of the sufficient deflecting ability and the sufficient focusing ability can be recorded by a relatively simple optical recording system, and can be reproduced by a collimated reproducing light beam 35.

The steps of obtaining the most suitable aberrational wave (aspherical wave 49, 149) as the reference wave in the recording process to minimize the aberration of the diffraction light beam 36 or 136 at the image surface 24 or 124, and also the method of determining the optical system to realize the aberrational wave by mathematical programming, in the second and third embodiments, will be explained hereinafter.

The phase $\phi_H$ of a hologram recorded by non-aberrational and divergent spherical waves with phases of $\phi_O$ and $\phi_R$ is expressed by the following equation.

$$\phi_H = \phi_O - \phi_R$$

wherein, $$\phi_O = \frac{2\pi}{\lambda_1} PO$$

$$\phi_R = \frac{2\pi}{\lambda_1} PR$$

P: arbitrary point on the hologram plane
O,R: center positions of the spherical waves
$\lambda_1$: wave length of the recording waves The phase $\phi_{H'}$ of a hologram including wavefront aberration W is expressed by the following equation (5).

$$\phi_{H'} = \phi_O - \phi_R + \frac{2\pi}{\lambda_1} W \qquad (5)$$

wherein, $$W(x, y) = C_1 x^2 + C_2 y^2 + C_3 x^4 + C_4 x^2 y^2 + C_5 y^4 + C_6 x^6 + \qquad (6)$$
$$C_7 x^4 y^2 + C_8 x^2 y^4 + C_9 y^6 + C_{10} x^8 + C_{11} x^6 y^2 + C_{12} x^4 y^4 +$$
$$C_{13} x^2 y^6 + C_{14} y^8 + \ldots$$

In the equation (6), the $C_1$, $C_2$, ... are unknown coefficients, which optimum values are obtained so as to minimize the variance of the aberration on the image surface in the reproducing operation of the hologram, as following.

At first, the $C_1$, $C_2$, ... are set to some initial values, and the phase $\phi_H'$ is obtained, optical beam tracing is possible, and thus, the transverse aberration $\Delta X$ and $\Delta Y$ can be obtained.

The variance of the aberration is then calculated by the following equation (7).

$$\sum_M \sum_N \{(W_{MX}\Delta x)^2 + (W_{MY}\Delta y)^2\} \quad (7)$$

wherein,
M: scan position
N: light beam
$W_{MX}$: weight of a scan position M in the X direction
$W_{MY}$: weight of a scan position M in the Y direction At this stage, the minimization of the equation (7) is considered with the constraint of the specification, such as the scan width and the scan line curvature, etc. of the hologram scanner.

Since the equation (7) represents a function which is not linear with respect to the design parameters $C_1$, $C_2$, ..., this minimization results in a non-linear programming problem with the constraint, which can be, for examle, mathematically solved by a damped least square (DLS) method.

In the non-linear programming method, the solution is obtained by successive approximation, which does not give any insurance of obtaining the optimum solution in a strict sense. But, by applying different initial values and different weights, and by performing the approximation repeatedly, the resultant solution can be approached to the better one.

As described above, the optimum values $C_1^*, C_2^*, ...$ of the coefficients $C_1, C_2, ...$ can be obtained. Thus the most proper wavefront aberration $W^*$ to be utilized in the hologram recording process, can be finally obtained, as the aberration $W^*$ is expressed by the following equation (8).

$$W^* = C_1^* x^2 + C_2^* y^2 + C_3^* x^4 + C_4^* x^2 y^2 + C_5^* y^4 + .. \quad (8)$$

If such an optical system as can generate the aberration same as the above mentioned $W^*$ is investigated, it is concluded that the aforementioned anamorphic lens 41 in the second embodiment and the aforementioned compound optical system of the prism 101 and the spherical lens 102 in the third embodiment are suitable one.

The power distribution or parameters in shape and the position of the lens can be determined such that an aberration $W'$ generated by the lens is coincident with the aberration $W^*$. More particularly, the variance of the aberrations are minimized, i.e., the power distribution or the parameters in shape and the position of the lens, which give the minimum value of the variance value expressed by the following equation (9), is to be the requested solution.

$$\sum_N (W' - W^*)^2 \quad (9)$$

wherein, N represents each light beam at the hologram recording area.

Consequently, if the aspherical wave including the aberration $W'$ is generated as the reference light (the aspherical wave 49 or 147) by use of the anamorphic lens 41 or the compound optical system of the prism 101 and the spherical lens 102 obtained in the above mentioned manner, and if this aspherical wave is interfered with the object wave (spherical wave 47 or 147), such a hologram 22 or 122 as has a same phase as in the equation (5) can be recorded, resulting in that the variance of the aberration in the reproducing operation of the hologram can be minimized.

As explained above, by utilizing the hologram, which is recorded by use of the aberrational wave generated by inputting the spherical wave to the anamorphic lens or the compound optical system of the prism and the spherical lens which power distribution or parameter in shape is determined by mathematical programming, the coma-aberration, the astigmatism and the curvature of field can be reduced to a great extent in the reproducing operation of the hologram i.e. the scanning operation of the hologram scanner.

In the above descrived second and third embodiments, the reproducing light beam is a collimated light beam. However, this is not indispensable. The hologram scanners may be adapted to utilize a convergent type or a divergent type reproducing light beam.

Many widely different embodiments of the present invention may be constructed without departing from the spirit and scope of the present invention. It should be understood that the present invention is not limited to the specific embodiments described in this specification, except as defined in the appended claims.

What is claimed is:

1. A method of recording and reproducing a hologram in a hologram scanner, comprising the steps of:

generating by an object light source disposed at a first position, an object light in the form of a divergent spherical wave directed toward a hologram recording plane of a hologram disk on which a hologram is to be recorded, said first position being at a first distance from said hologram recording plane;

generating by a reference light source disposed at a second position, a reference light in the form of a divergent spherical wave directed toward said hologram recording plane so as to record said hologram thereon by a mutual interference of said object light and said reference light, said second position being at a second distance from said hologram recording plane;

wherein neither of said first and second positions lies on the center axis of said hologram disk; and reproducing said hologram by applying a collimated reproducing light beam to said hologram so as to deflect said reproducing light beam by diffraction and to scan an image surface by said deflected reproducing light beam while rotating said hologram disk, said first and second distances being different from each other so that said deflected reproducing light beam is focused on said image surface.

2. A method according to claim 1, wherein said first and second positions are selected so as to provide a desirable focusing power and a desirable deflecting power when recording said hologram.

3. A hologram scanner comprising:

a reproducing light source for generating a collimated reproducing light beam;

a hologram disk being adapted to rotate; and a hologram disposed on said hologram disk for deflecting said reproducing light beam by diffraction so as to scan an image surface by said deflected reproducing light beam during a rotation of said hologram disk;

said hologram having interference fringes recording by a mutual interference of an object light in the form of a divergent spherical wave and a reference light in the form of a divergent spherical wave, said object light being generated by an object light source positioned at a first position offset from the center axis of said hologram disk at a first distance from a hologram recording plane of said hologram disk on which said hologram is to be recorded, said reference light being generated by a reference light source positioned at a second position offset from the center axis of said hologram disk at a second distance from said hologram recording plane, said first and second distances being different from each other so that said deflected reproducing light beam is focused on said image surface.

4. A hologram scanner according to claim 3, wherein said reproducing light source comprises a semiconductor laser source.

5. A method of recording and reproducing a hologram in a hologram scanner, comprising the steps of:

recording a hologram on a hologram recording plane of a hologram disk by a mutual interference of an object light and a reference light, at least one of which is an aberrational wave, so that said hologram has interference fringes different from quadratic curves; and reproducing said hologram by applying a reproducing light beam to said hologram so as to deflect said reproducing light beam by diffraction and to scan an image surface by said deflected reproducing light beam while rotating said hologram disk, said aberrational wave being generated by inputting a spherical wave to an anamorphic lens the power distribution of which is selected so that an aberration of said deflected reproducing light beam on said image surface is minimized.

6. A method according to claim 5, wherein each of a sagittal plane profile and a meridional plane profile of said anamorphic lens is in a shape of polynomial of higher order.

7. A method according to claim 5, wherein each of a sagittal plane profile and a meridional plane profile of said anamorphic lens is in a circular shape, the curvatures of each said profiles being different from each other.

8. A method according to claim 5, wherein one of a sagittal plane profile and a meridional plane profile of said anamorphic lens is in a circular shape while the other of said sagittal plane profile and said meridional plane profile is in a quadratic curve shape other than a circular shape.

9. A method according to claim 5, wherein one of a sagittal plane profile and a meridional plane profile of said anamorphic lens is in a circular shape while the other of said sagittal plane profile and said meridional plane profile is in a shape of polynomial of higher order other than a circular shape.

10. A method according to claim 5, wherein each of a sagittal plane profile and a meridional plane profile of said anamorphic lens is in a quadratic curve shape other than a circular shape.

11. A method according to claim 5, wherein each of said object light and said reference light is obtained from an argon laser source.

12. A hologram scanner comprising:

a reproducing light source for generating a reproducing light beam;

a hologram disk being adapted to rotate; and a hologram disposed on said hologram disk for deflecting said reproducing light beam by diffraction so as to scan an image surface by said deflected reproducing light beam during a rotation of said hologram disk;

said hologram having interference fringes different from quadratic curves and being recorded by a mutual interference of an object light and a reference light, at least one of which is an aberrational wave, said aberrational wave being generated by inputting a spherical wave to an anamorphic lens the power distribution of which is selected so that an aberration of said deflected reproducing light beam on said image surface is minimized.

13. A hologram scanner according to claim 12, wherein said reproducing light beam is a collimated light beam.

14. A hologram scanner according to claim 12, wherein said reproducing light source comprises a semiconductor laser source.

15. A method of recording and reproducing a hologram in a hologram scanner, comprising the steps of:

recording a hologram on a hologram recording plane of a hologram disk by a mutual interference of an object light and a reference light, at least one of which is an aberrational wave, so that said hologram has interference fringes different from quadratic curves; and reproducing said hologram by applying a reproducing light beam to said hologram so as to deflect said reproducing light beam by diffraction and to scan an image surface by said deflected reproducing light beam while rotating said hologram disk, said aberrational wave being generated by inputting a spherical wave to a compound optical system including a prism and a spherical lens the shapes of which are selected so that an aberration of said deflected reproducing light beam on said image surface is minimized.

16. A method according to claim 15, wherein each of said object light and said reference light is obtained from an argon laser source.

17. A hologram scanner comprising:

a reproducing light source for generating a reproducing light beam;

a hologram disk being adapted to rotate; and a hologram disposed on said hologram disk for deflecting said reproducing light beam by diffraction so as to scan an image surface by said deflected reproducing light beam during a rotation of said hologram disk, said hologram having interference fringes different from quadratic curves and recorded by a mutual interference of an object light and a reference light, at least one of which is an aberrational wave, said aberrational wave being generated by inputting a spherical wave to a compound optical system including a prism and a spherical lens the shapes of which are selected so that an aberration of said deflected reproducing light beam on said image surface is minimized.

18. A hologram scanner according to claim 17, wherein said reproducing light beam is a collimated light beam.

19. A hologram scanner according to claim 17, wherein said reproducing light source comprises a semiconductor laser source.

* * * * *